United States Patent
Nakano et al.

(10) Patent No.: US 8,373,620 B2
(45) Date of Patent: Feb. 12, 2013

(54) IN-VEHICLE DISPLAY APPARATUS

(75) Inventors: Masahiko Nakano, Kobe (JP);
Tadayoshi Une, Kobe (JP); Nobutaka Ukyou, Kobe (JP); Tomohiro Nakazono, Kobe (JP); Nobutaka Miyauchi, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 687 days.

(21) Appl. No.: 12/225,997

(22) PCT Filed: Nov. 29, 2006

(86) PCT No.: PCT/JP2006/323768
§ 371 (c)(1),
(2), (4) Date: Oct. 3, 2008

(87) PCT Pub. No.: WO2007/122764
PCT Pub. Date: Nov. 1, 2007

(65) Prior Publication Data
US 2009/0262045 A1 Oct. 22, 2009

(30) Foreign Application Priority Data
Apr. 14, 2006 (JP) .................................. 2006-112441

(51) Int. Cl.
*G09G 3/00* (2006.01)
(52) U.S. Cl. ............ 345/32; 345/1.1; 345/156; 345/204
(58) Field of Classification Search ................. 345/7, 32; 348/835; 359/613
See application file for complete search history.

(56) References Cited

U.S. PATENT DOCUMENTS

| | | | |
|---|---|---|---|
| 6,046,849 A | 4/2000 | Moseley et al. | |
| 6,055,013 A | 4/2000 | Woodgate et al. | |
| 6,055,103 A | 4/2000 | Woodgate et al. | |
| 6,377,295 B1 | 4/2002 | Woodgate et al. | |
| 6,437,915 B2 | 8/2002 | Moseley et al. | |
| 6,624,863 B1 | 9/2003 | Jacobs et al. | |
| 7,847,786 B2 * | 12/2010 | Schobben et al. ............ | 345/156 |
| 2003/0007227 A1 | 1/2003 | Ogino | |
| 2006/0028453 A1 * | 2/2006 | Kawabe ........................ | 345/173 |
| 2006/0066507 A1 | 3/2006 | Yanagisawa | |
| 2007/0216805 A1 * | 9/2007 | Yamamoto et al. ........... | 348/565 |
| 2008/0068284 A1 * | 3/2008 | Watanabe et al. .............. | 345/1.1 |

FOREIGN PATENT DOCUMENTS

| | | |
|---|---|---|
| GB | 2 405 546 A | 3/2005 |
| GB | 2 415 105 A | 12/2005 |
| JP | A-06-186526 | 7/1994 |
| JP | A-06-236152 | 8/1994 |
| JP | A-09-046622 | 2/1997 |
| JP | A-10-123461 | 5/1998 |
| JP | A-11-084131 | 3/1999 |
| JP | A-11-331876 | 11/1999 |

(Continued)

*Primary Examiner* — Amare Mengistu
*Assistant Examiner* — Stacy Khoo
(74) *Attorney, Agent, or Firm* — Oliff & Berridge, PLC

(57) ABSTRACT

There is provided an in-vehicle display apparatus including a display unit that displays different images to be seen from a driver's seat side and a passenger's seat side; and an image control unit that causes the driver's seat side to display a navigation image, when operation mode is switched from a second operation mode in which an operation on a second image displayed on the passenger's seat side is allowed, to a first operation mode in which an operation on a first image displayed on the driver's seat side is allowed.

5 Claims, 13 Drawing Sheets

FOREIGN PATENT DOCUMENTS

| | | |
|---|---|---|
| JP | A-2000-036927 | 2/2000 |
| JP | A-2000-137443 | 5/2000 |
| JP | A-2002-243488 | 8/2002 |
| JP | A-2003-137005 | 5/2003 |
| JP | A-2004-206471 | 7/2004 |
| JP | A-2004-233816 | 8/2004 |
| JP | A-2005-071286 | 3/2005 |
| JP | A-2005-073076 | 3/2005 |
| JP | A-2005-078080 | 3/2005 |
| JP | A-2005-284592 | 10/2005 |
| WO | WO 2004/016460 A1 | 2/2004 |
| WO | WO 2004036286 A1 * | 4/2004 |

* cited by examiner

GROUP OF FIRST IMAGES (IMAGE IS DISPLAYED ON LEFT SIDE)

GROUP OF SECOND IMAGES (IMAGE IS DISPLAYED ON RIGHT SIDE)

FIG. 11A
P-SEAT SCREEN     D-SEAT SCREEN
IM2    FIRST OPERATION MODE    IM1    SECOND OPERATION MODE
FIG. 11B
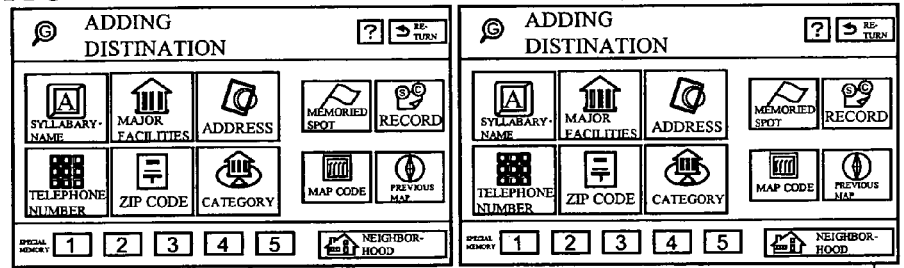
IM2  TOUCH PANEL SWITCH    IM1  TOUCH PANEL SWITCH
FIG. 11C
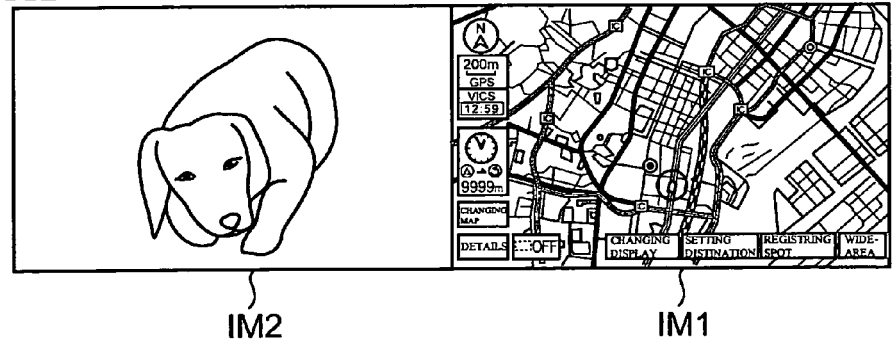
IM2    SECOND OPERATION MODE → FIRST OPERATION MODE    IM1
FIG. 11D
IM2    IM1

P-SEAT SCREEN          D-SEAT SCREEN

IM2          FIRST          IM1     SECOND
             OPERATION              OPERATION
FIG. 13B     MODE                   MODE

IM2    TOUCH PANEL SWITCH    IM1    TOUCH PANEL SWITCH
              SECOND                 FIRST
              OPERATION              OPERATION
FIG. 13C      MODE                   MODE

IM2                                           IM1

IN-VEHICLE DISPLAY APPARATUS

TECHNICAL FIELD

The present invention relates to an in-vehicle display apparatus, and in particular to an in-vehicle display apparatus which can display different images from respective different directions on a common display screen.

BACKGROUND ART

As a so-called multi-view display having a common (an individual) display screen, on which different images (for example, a first image and a second image) are respectively visible from different angles (for example, a driver's seat side and a passenger's seat side), there has been known a multi-view display with a liquid crystal panel having a parallax barrier on the front side thereof. Different information (images) can be displayed on the right and left sides of the display screen by separating directions of lights through a backlight on a pixel basis (for example, see Document 1). Such a display mounted on a vehicle allows the front-seat passenger to watch a TV program or another image, while the driver is checking a navigation map image.
Document 1: Japanese Patent Application Publication No. 2005-78080

DISCLOSURE OF THE INVENTION

Problems to be Solved by the Invention

In a case where a multi-view display is used as an in-vehicle display apparatus, the operation mode might be switched between a first operation mode in which an operation on a first image displayed on the driver's seat side is allowed, and a second operation mode in which an operation on a second image displayed on the passenger's seat side is allowed. If the second image displayed on the passenger's seat side is displayed on the driver's seat side at the time of switching from the second operation mode to the first operation mode, the driver needs to perform an operation to change the first image to a desired image. Accordingly, there are times when the driver is required to repeat an operation. However, the driver should concentrate on driving, and it is undesirable to cause an increase in the number of operations to be performed to handle the display apparatus.

It is therefore an object of the present invention to provide an in-vehicle display apparatus that can reduce the number of operations to be performed by the driver.

Means for Solving the Problems

The above object is achieved by an in-vehicle display apparatus including: a display unit that displays different images to be seen from a driver's seat side and a passenger's seat side; and an image control unit that causes the driver's seat side to display a navigation image, when operation mode is switched from a second operation mode in which an operation on a second image displayed on the passenger's seat side is allowed, to a first operation mode in which an operation on a first image displayed on the driver's seat side is allowed. In accordance with this invention, when the operation mode is switched from the second operation mode to the first operation mode, a navigation screen the driver often operates is displayed on the driver's seat side. Accordingly, the number of operations to be performed by the driver can be reduced.

The in-vehicle display apparatus may be configured so that the navigation image is a map of an area surrounding a present location. With this structure, a map of the area surrounding the present location that has the highest possibility of the use by the driver is displayed on the driver's seat side. Accordingly, the number of operations to be performed by the driver can be further reduced.

The in-vehicle display apparatus may be configured so that, when the vehicle is running at the time of switching to the first operation mode, the image control unit causes the driver's seat side to display a map of an area surrounding a present location as the navigation image. With this structure, a map of the area surrounding the present location that has the highest possibility of the use by the driver is displayed on the driver's seat side. Accordingly, the number of operations to be performed by the driver can be further reduced.

The above object is achieved by an in-vehicle display apparatus including: a display unit that displays different images to be seen from a driver's seat side and a passenger's seat side; and an image control unit that causes the driver's seat side to display an image, when operation mode is switched from a second operation mode in which an operation on a second image displayed on the passenger's seat side is allowed, to a first operation mode in which an operation on a first image displayed on the driver's seat side is allowed, the image being displayed as the first image on the driver's seat side immediately before previous switching from the first operation mode to the second operation mode. There is a high possibility that the driver who has regained the operating right handles the image the driver was handling immediately before the switching of the operating right. In accordance with this invention, the driver can handle the image on which the driver had the operating right immediately before the switching of the operating right, without an operation to retrieve the image. Accordingly, the number of operations to be performed by the driver can be reduced.

The in-vehicle display apparatus may be configured so that, when the vehicle is running at the time of switching to the first operation mode, the image control unit causes the driver's seat side to display a map of an area surrounding a present location as a navigation image. While the vehicle is running, there is a high possibility that the driver handles a map of the area surrounding the present location. Accordingly, the number of operations to be performed by the driver can be reduced with this structure.

Effects of the Invention

The present invention can provide a display apparatus for vehicles that reduces the number of operations to be performed by the driver.

BRIEF DESCRIPTION OF THE DRAWINGS

Preferred embodiments of the present invention will be described in detail with reference to the following drawings, wherein:

FIGS. 11A through 11D show a first image displayed on a D-seat screen and a second image displayed on a P-seat screen in accordance with the first embodiment;

FIGS. 13A through 13C show a first image displayed on a D-seat screen and a second image displayed on a P-seat screen in accordance with a second embodiment.

BEST MODE FOR CARRYING OUT THE INVENTION

A description will now be given, with reference to the accompanying drawings, of embodiments of the present invention.

First Embodiment

Figure 1:
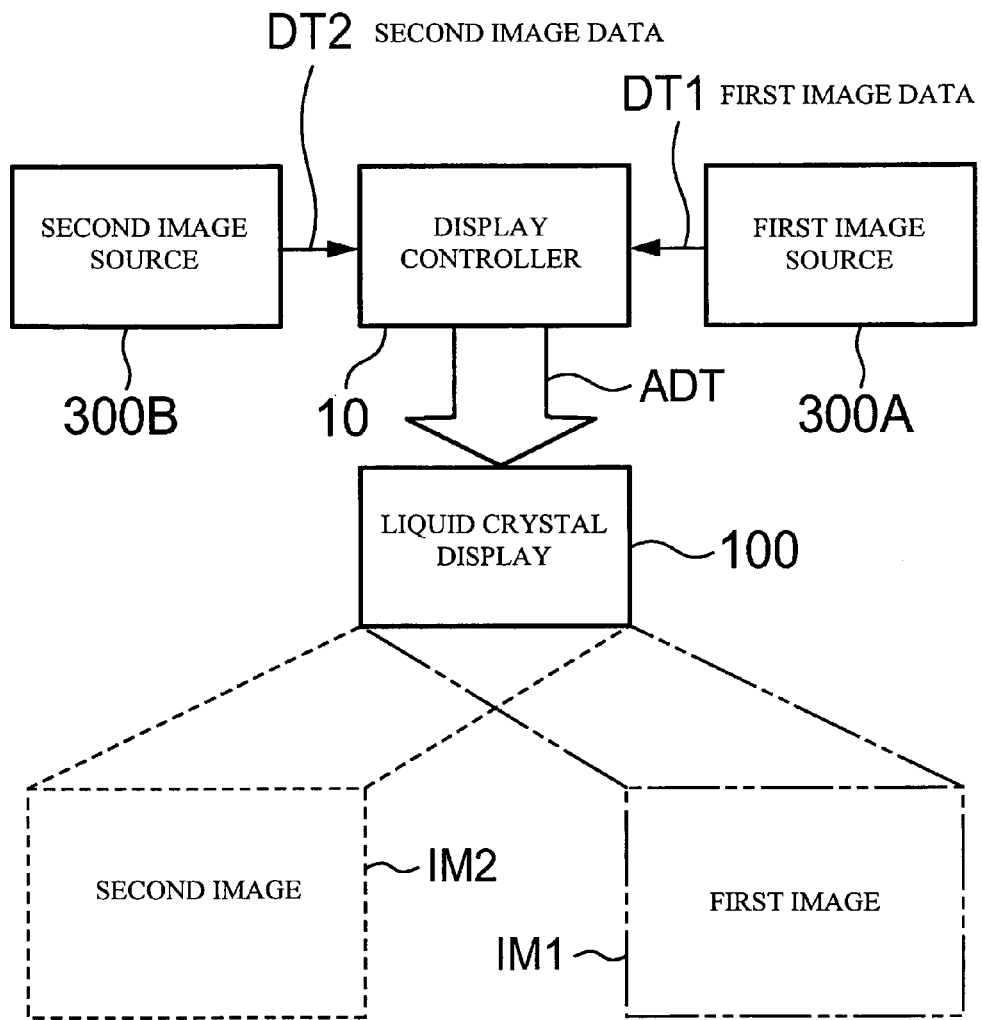
FIG. 1 is a view illustrating a basic configuration of a multi-view display apparatus in accordance with a first embodiment of the present invention.
Figure 1:
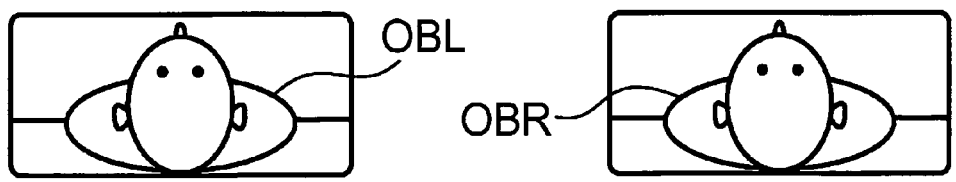

FIG. 1 is a view illustrating a basic configuration of a multi-view display apparatus in accordance with a first embodiment of the present invention. Referring now to FIG. 1, the multi-view display apparatus includes a display controller 10 and a liquid crystal display 100 that serves as a display portion. To the display controller 10, image data DT1 is supplied from a first image source 300A that servers as a supply source, and at the same time, image data DT2 is also supplied from a second image source 300B that servers as a supply source. The supply source may be a navigation portion or a TV program portion. Then, image data ADT, which is composed of the first image data DT1 and the second image data DT2, is output to the commonly provided display 100. The configuration of the display controller 10 will be described later in detail. The first image source 300A and the second image source 300B are respectively composed of a camera, TV receiver, DVD reproducing portion, HD reproducing portion, navigation portion, and the like, as will be described later.

The display 100 includes a liquid crystal panel, backlight, parallax barrier, and the like, as will also be described later. A first image IM1 based on the first image data DT1 and a second image IM2 based on the second image data DT2 are displayed on a common display screen so that an observer OBR can watch the first image IM1 from a right-hand direction and an observer OBL can watch the second image IM2 from a left-hand direction. The configuration of the display 100 will also be described later in detail.

Figure 2:
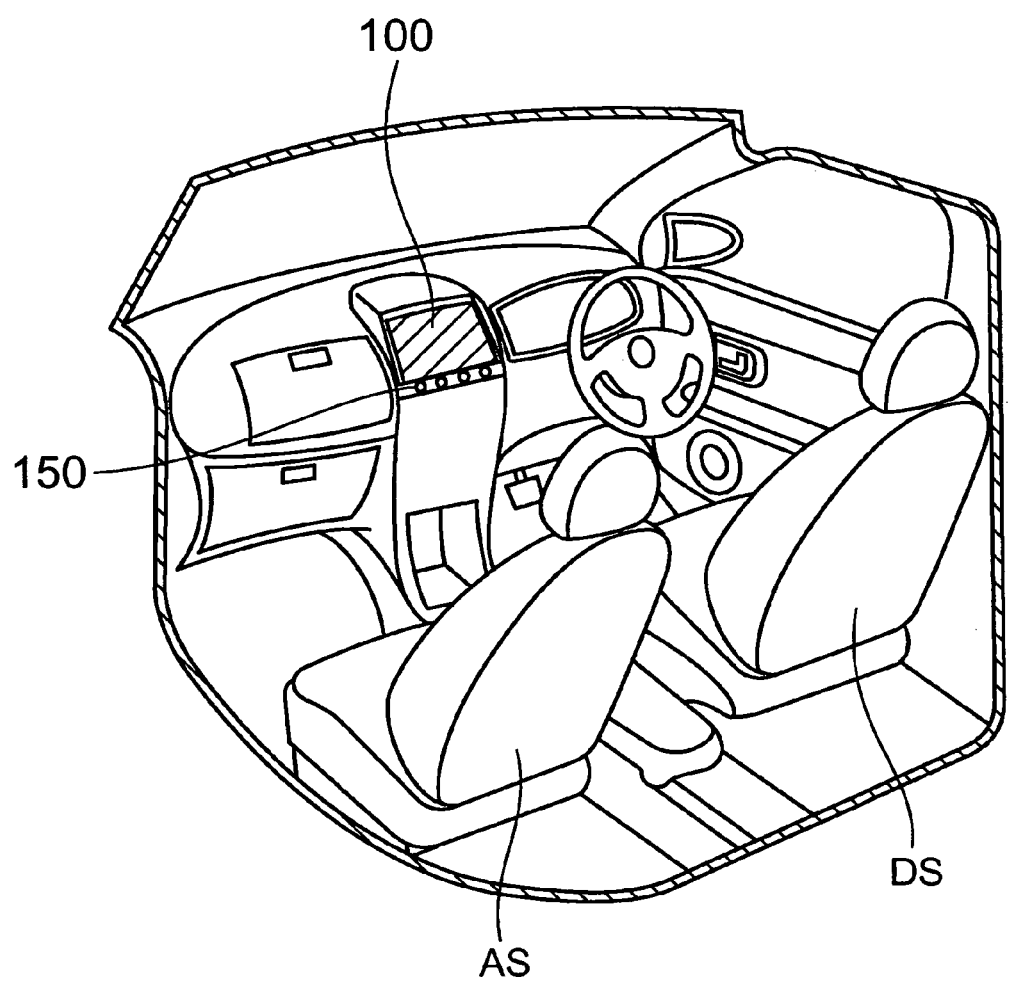
FIG. 2 is a perspective view showing an example in which the display apparatus is applied to a vehicle in accordance with the first embodiment of the present invention.

FIG. 2 is a perspective view showing an example in which the display apparatus is applied to a vehicle in accordance with the first embodiment of the present invention. Referring to FIG. 2, the display 100 is arranged between a driver's seat D seat and a front passenger's seat P seat in a dashboard area of the vehicle. In addition, the display 100 is provided with an operating portion 150 so as to manually operate the display apparatus. According to an exemplary embodiment shown in FIG. 2, a passenger who sits on the driver's seat D seat corresponds to the above-described observer OBR, and another passenger who sits on the front passenger's seat P seat corresponds to the above-described observer OBL. Those passengers are able to simultaneously watch the first image IM1 and the second image IM2, which are respectively different, being displayed on the display 100 from the driver's seat D seat and from the front passenger's seat P seat.

Figure 3:
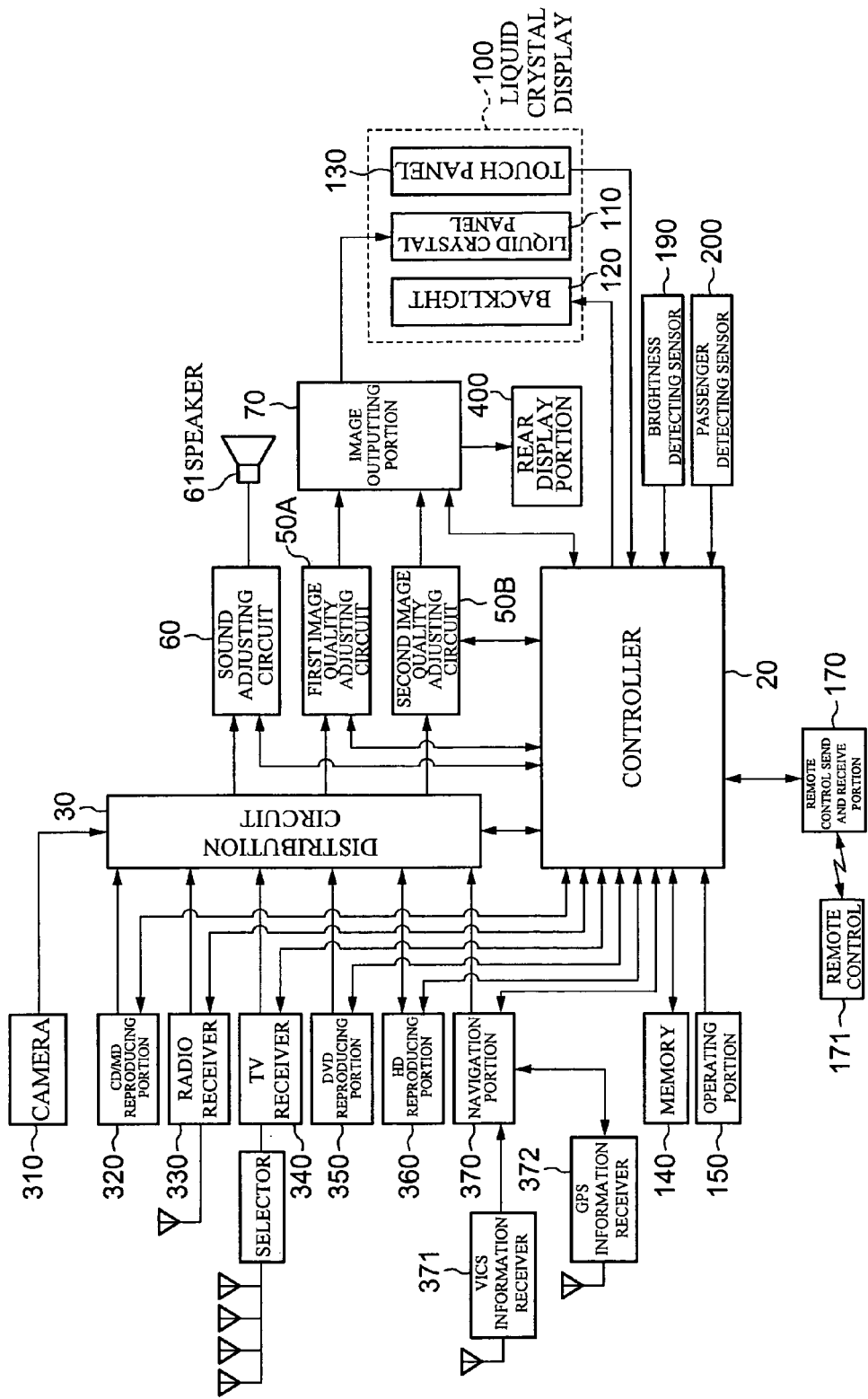
FIG. 3 is a functional block diagram of the display apparatus in accordance with the first embodiment of the present invention.
Figure 4:
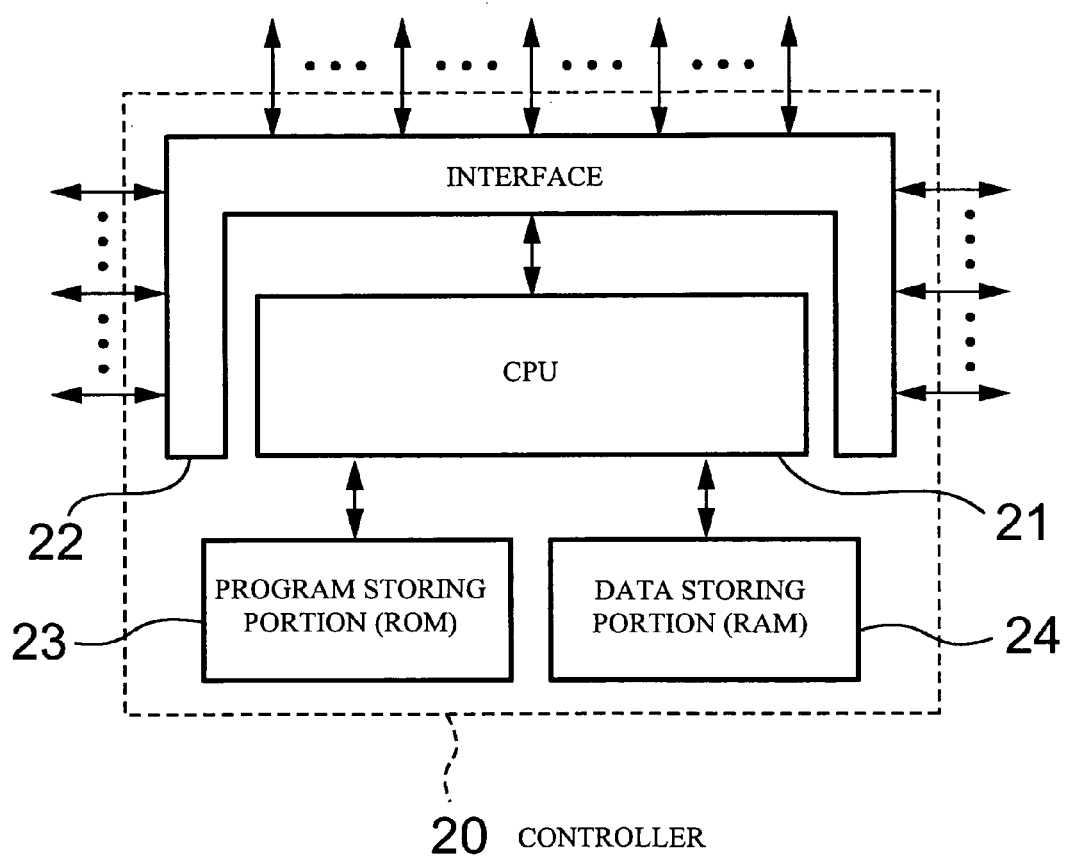
FIG. 4 is a functional block diagram showing a configuration of a controller in accordance with the first embodiment of the present invention.
Figure 5:
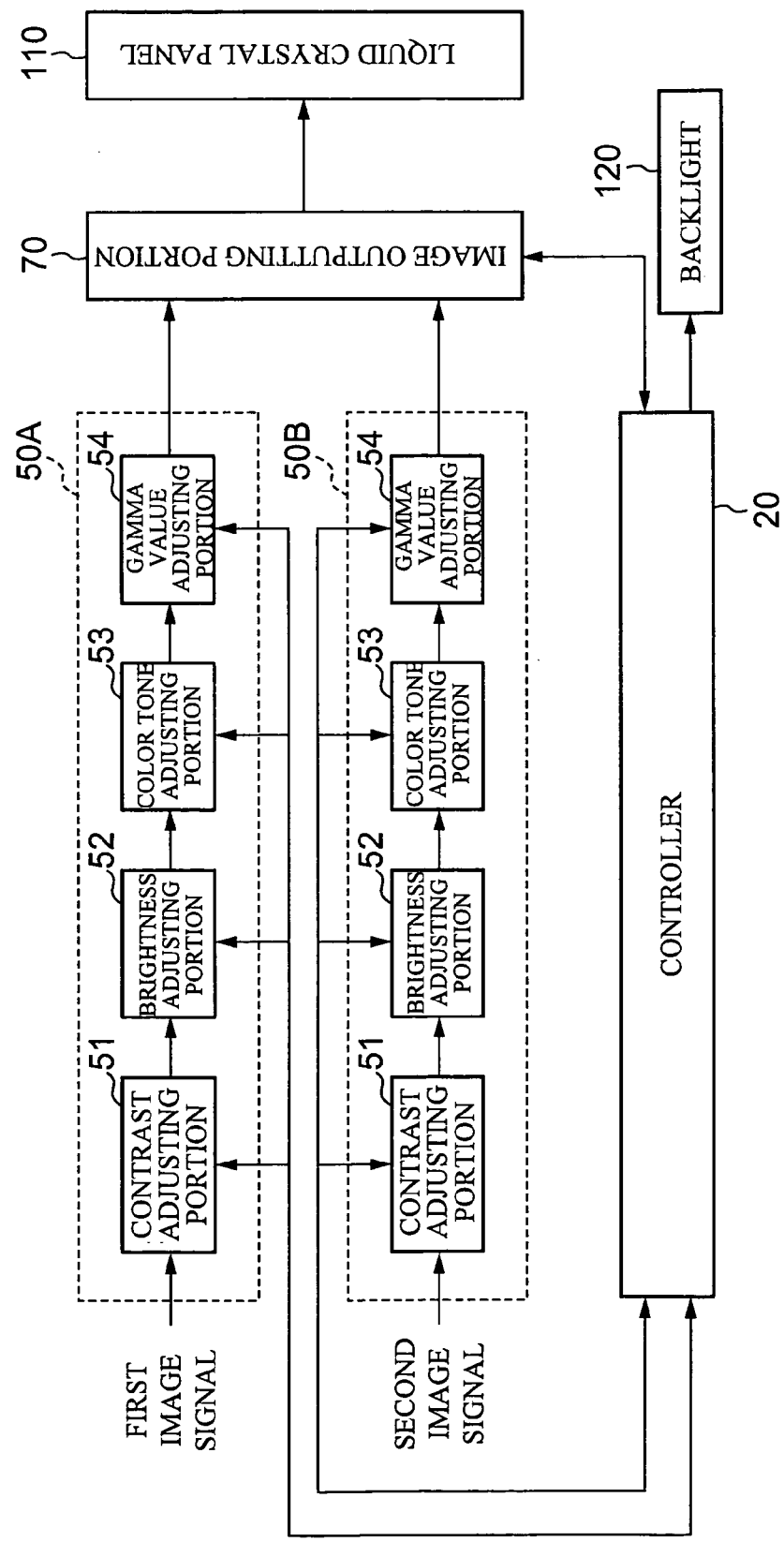
FIG. 5 is a functional block diagram of first and second image quality adjusting circuits in accordance with the first embodiment of the present invention.
Figure 6:
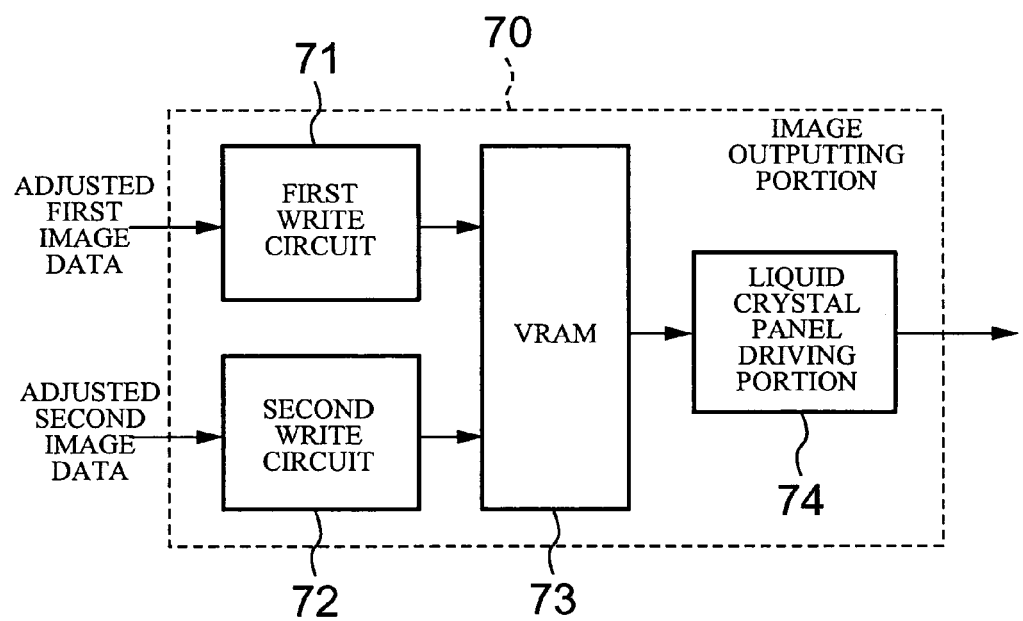
FIG. 6 is a functional block diagram of an image outputting portion in accordance with the first embodiment of the present invention.
Figure 7:
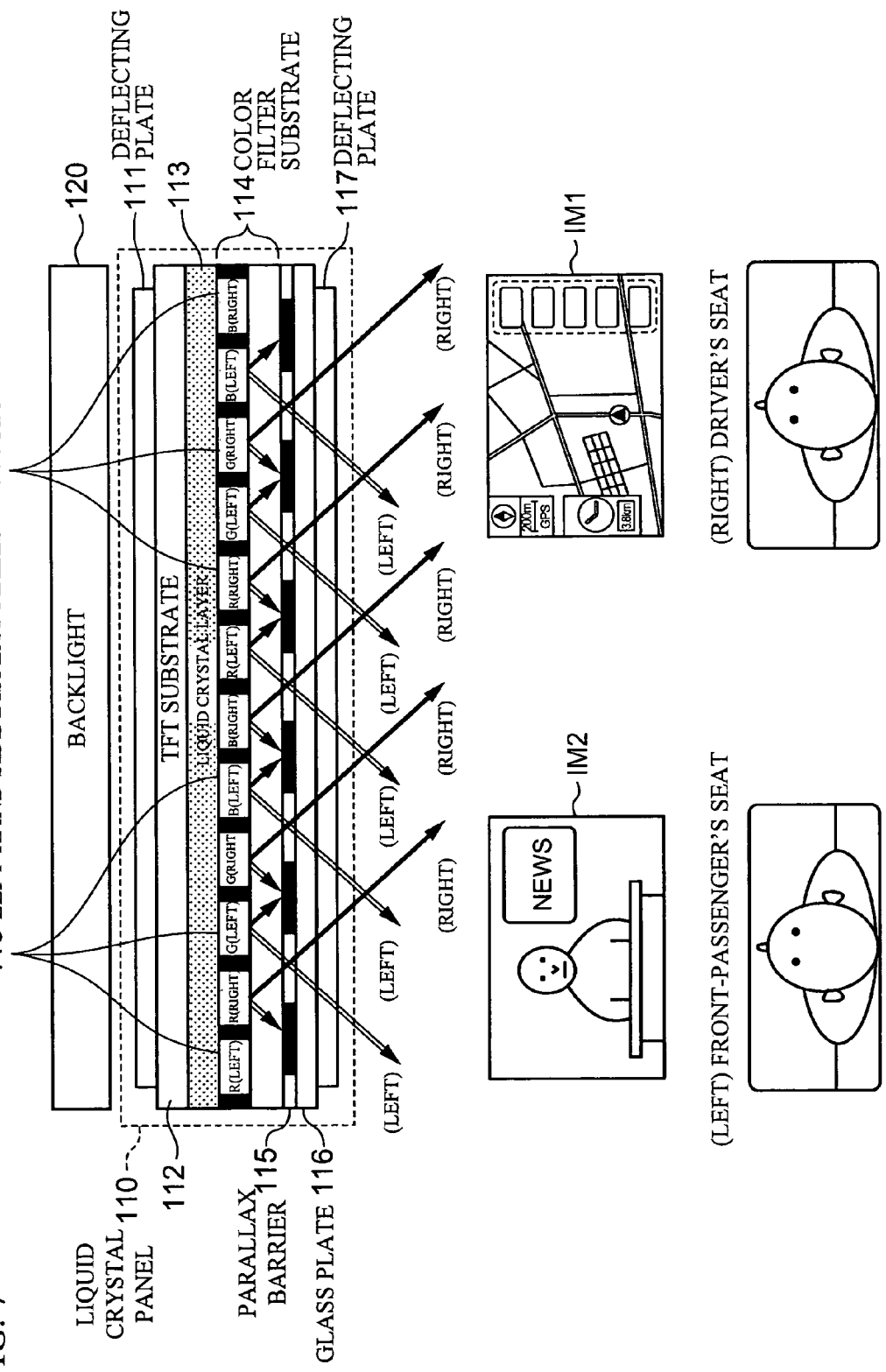
FIG. 7 is a view illustrating a cross-sectional configuration and effects of a liquid crystal panel in accordance with the first embodiment of the present invention.
Figure 8:
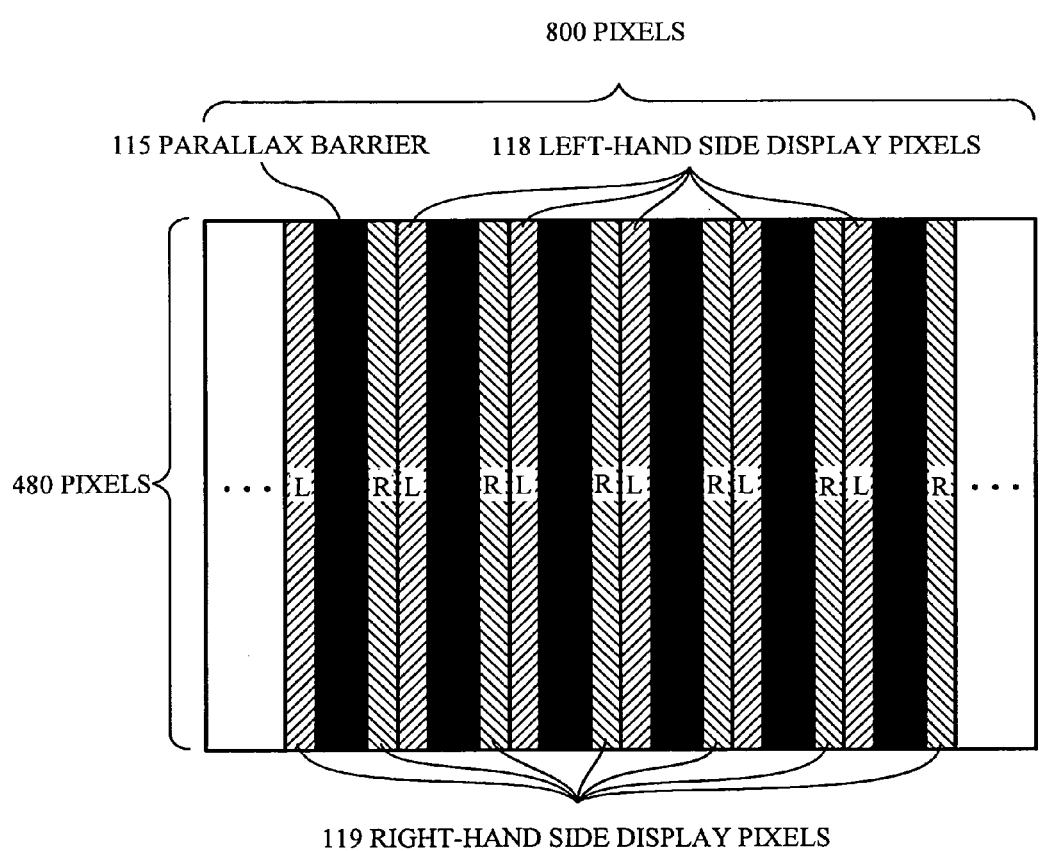
FIG. 8 is a front view of the liquid crystal panel in accordance with the first embodiment of the present invention.
Figure 9:
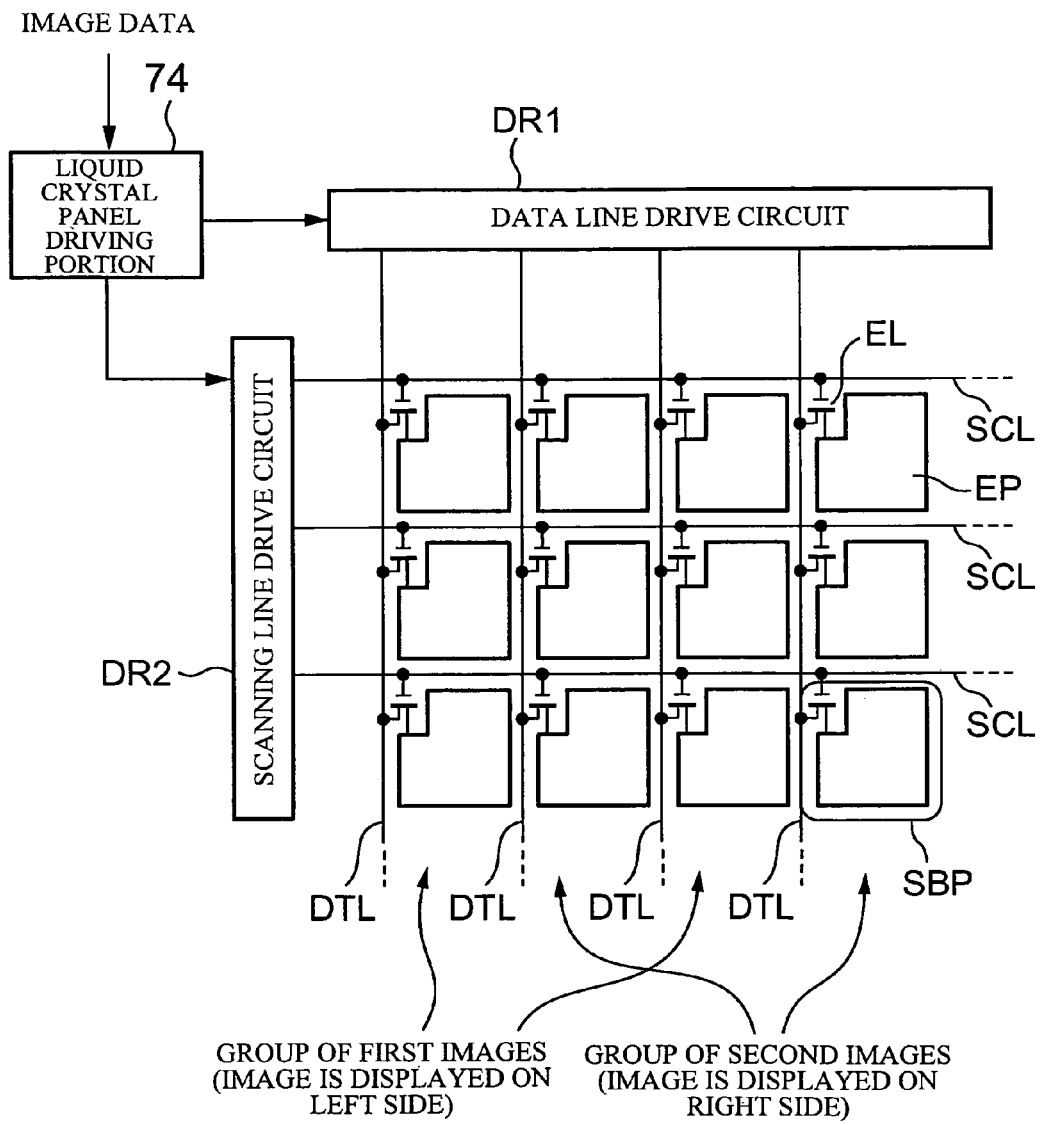
FIG. 9 is a circuit diagram of a TFT substrate in accordance with the first embodiment of the present invention.

FIG. 3 through FIG. 9 illustrate specific configurations of the display apparatus in accordance with the first embodiment of the present invention. FIG. 3 is a functional block diagram of the display apparatus. FIG. 4 is a functional block diagram showing a configuration of the controller. FIG. 5 is a functional block diagram of first and second image quality adjusting circuits. FIG. 6 is a functional block diagram of an image outputting portion. FIG. 7 is a view illustrating a cross-sectional configuration and effects of a liquid crystal panel. FIG. 8 is a front view of the liquid crystal panel. FIG. 9 is a circuit diagram of a TFT (Thin Film Transistor) substrate.

Referring now to FIG. 3, the display apparatus includes the display 100, a controller 20, a distribution circuit 30, a first image quality adjusting circuit 50A, a second image quality adjusting circuit 50B, an image outputting portion 70, and the like. The display controller 10 includes the controller 20, the distribution circuit 30, the first image quality adjusting circuit 50A, the second image quality adjusting circuit 50B, the image outputting portion 70, and the like.

Referring now to FIG. 4, the controller 20 includes a processor (CPU) 21, an interface 22, a ROM 23, a RAM 24, and the like. The controller 20 controls the display apparatus according to a program stored in the ROM 23 in a comprehensive manner. Also, the controller 20 controls a visible range of the first image IM1 and a visible range of the second image IM2, which are separated from each other by superimposing the first image IM1 and the second image IM2 to be displayed on the display 100, by adjusting the image quality of at least one of the first image IM1 and the second image IM2 to have a given range.

The controller 20 is connected to a camera 310, a compact disc/mini disc (CD/MD) reproducing portion 320, a radio receiver 330, a TV receiver 340, a DVD reproducing portion 350, an HD reproducing portion 360, a navigation portion 370, and the like, so as to send and receive data and control the afore-described components, which are mounted on a vehicle and respectively serve as supply sources supplying images and sounds, as illustrated in FIG. 3. The camera 310 captures images of surroundings and the like of the vehicle. The CD/MD reproducing portion 320 reproduces music or images. The radio receiver 330 receives radio waves via an antenna. The TV receiver 340 receives TV waves via an antenna through a selector 341. The DVD reproducing portion 350 reproduces music information and images. The HD reproducing portion 360 reproduces images and music information stored in a hard disc. The navigation portion 370 outputs a map or route guide image on the basis of road information received by a VICS (Vehicle Information and Communication System) information receiver 371 and geographic information received by a GPS (Global Positioning System) information receiver 372.

Additionally, the controller 20 is also connected to an external memory 140, the operating portion 150, a remote control send and receive portion 170, a brightness detecting sensor 190, a passenger detecting sensor 200, and the like, and enables various controls on the basis of various kinds of data obtained from the afore-mentioned components. The external memory 140 stores various kinds of data. The operating portion 150 is provided for operating the display apparatus. The remote control send and receive portion 170 sends and receives infrared signals or wireless signals between a remote controller 171 provided for controlling the display apparatus remotely. The brightness detecting sensor 190 is composed of a light switch or a light sensor to detect the brightness inside the vehicle. The passenger detecting sensor 200 is composed of a pressure-sensitive sensor or the like on the driver's seat or the front passenger's seat to detect a passenger in the vehicle.

The distribution circuit 30, as illustrated in FIG. 3, distributes sound data and image data supplied from the above-described camera 310, the CD/MD reproducing portion 320, the radio receiver 330, the TV receiver 340, the DVD reproducing portion 350, the HD reproducing portion 360, the navigation portion 370, and the like, to the first image quality adjusting circuit 50A or the second image quality adjusting circuit 50B, according to a control instruction issued by the controller 20.

A sound adjusting circuit 60 adjusts the sound data supplied from the distribution circuit 30 to output to a speaker 61, as illustrated in FIG. 3.

Each of the first image quality adjusting circuit 50A and the second image quality adjusting circuit 50B, by reference to FIG. 5, includes a contrast adjusting portion 51, a brightness adjusting portion 52, a color tone adjusting portion 53, a gamma value adjusting portion 54, and the like, and adjusts the image qualities (contrast, brightness, color tone, and gamma value) of the image qualities of the first image data and the second image data, in response to the control instruction issued by the controller 20.

Referring now to FIG. 6, the image outputting portion 70 includes a first write circuit 71, a second write circuit 72, a video RAM (VRAM) 73, a liquid crystal panel driving portion 74, and the like. The first image data and the second image data, image qualities of which have respectively been adjusted by the first image quality adjusting circuit 50A and the second image quality adjusting circuit 50B, are respectively written into the first write circuit 71 and the second write circuit 72. The first write circuit 71 and the second write circuit 72 respectively write the first image data and the second image data, the image qualities of which are respectively adjusted by the first image quality adjusting circuit 50A and the second image quality adjusting circuit 50B, into given addresses of the VRAM 73, in order to superimpose such adjusted first image data and such adjusted second image data.

The VRAM 73 retains the image data on which the first image data and the second image data are combined. Such combined image data corresponds to respective pixels of the display 100. The liquid crystal panel driving portion 74 is a circuit that drives a liquid crystal panel 110, and also drives the corresponding pixels of the liquid crystal panel 110, on the basis of the combined image data retained in the VRAM 73. The liquid crystal panel 110 will be described later in detail.

The display 100 includes the liquid crystal panel 110, a backlight 120, a touch panel 130, and the like, as illustrated in FIG. 3. The backlight 120 sheds illuminated lights from the backside of the liquid crystal panel 110. The touch panel 130 is provided for inputting a signal to operate the display apparatus. Here, the touch panel 130 is not shown, yet is formed in a shape of transparent sheet and adhered to the front surface of the liquid crystal panel 110.

Referring now to FIG. 7, the liquid crystal panel 110 has a known structure. Sequentially from the backlight 120, there are provided a deflecting plate 111, a TFT substrate 112, a liquid crystal layer 113, a color filter substrate 114 having pixels for three primary colors of RGB, a parallax barrier 115, a glass plate 116, a deflecting plate 117, and the like.

The above-described liquid crystal panel 110 has a display screen in which, for example, 800 pixels are arranged in a horizontal direction and 480 pixels in a vertical direction, as illustrated in FIG. 7 and FIG. 8. Also, left-hand side display pixels 118 and right-hand side display pixels 119 are alternately arranged in a horizontal direction of the display screen.

The parallax barrier 115 is formed in a stripe-shaped manner, and includes shielding portions and transmitting portions, as illustrated in FIG. 7 and FIG. 8. The shielding portions are located to correspond to portions arranged between the left-hand side display pixels 118 and the right-hand side display pixels 119. By providing the parallax barrier 115 on the front surface of the color filter substrate 114, among the illuminated lights that have passed through the left-hand side display pixels 118, only the lights going towards the left side selectively pass through the transmitting portions of the parallax barrier 115. Among the illuminated lights that have passed through the right-hand side display pixels 119, only the lights going towards the right side selectively pass through the transmitting portions of the parallax barrier 115. This enables the first image IM1 to be visible from the right side (the driver's seat) of the liquid crystal panel 110, and also enables the second image IM2 to be visible from the left side (the front passenger's side). Here, a similar parallax barrier as disclosed in Japanese Patent Application Publication No. 10-123461 or Japanese Patent Application Publication No. 11-84131 may be employed for the parallax barrier 115.

The TFT substrate 112, by reference to FIG. 9, includes a data line drive circuit DR1, a scanning line drive circuit DR2, vertically arranged scanning lines SCL, horizontally arranged data lines DTL, TFT elements EL, pixel electrodes EP corresponding to the TFT elements EL, and the like, whereas each of the TFT elements EL is formed in each region where each of the scanning lines SCL and each of the data lines DTL are crossed. Sub pixels SBP are formed by regions surrounded by the scanning lines SCL and the data lines DTL, and the sub pixels SBP arranged along each of the data lines DTL are alternately assigned to the left-hand side display pixels 118 and the right-hand side display pixels 119. A drive timing of the data line drive circuit DR1 is controlled by the liquid crystal panel driving portion 74 to control a voltage applied to the pixel electrode EP. A Drive timing of the scanning line drive circuit DR2 is controlled by the liquid crystal panel driving portion 74 to selectively scan the TFT element EL.

Figure 10:
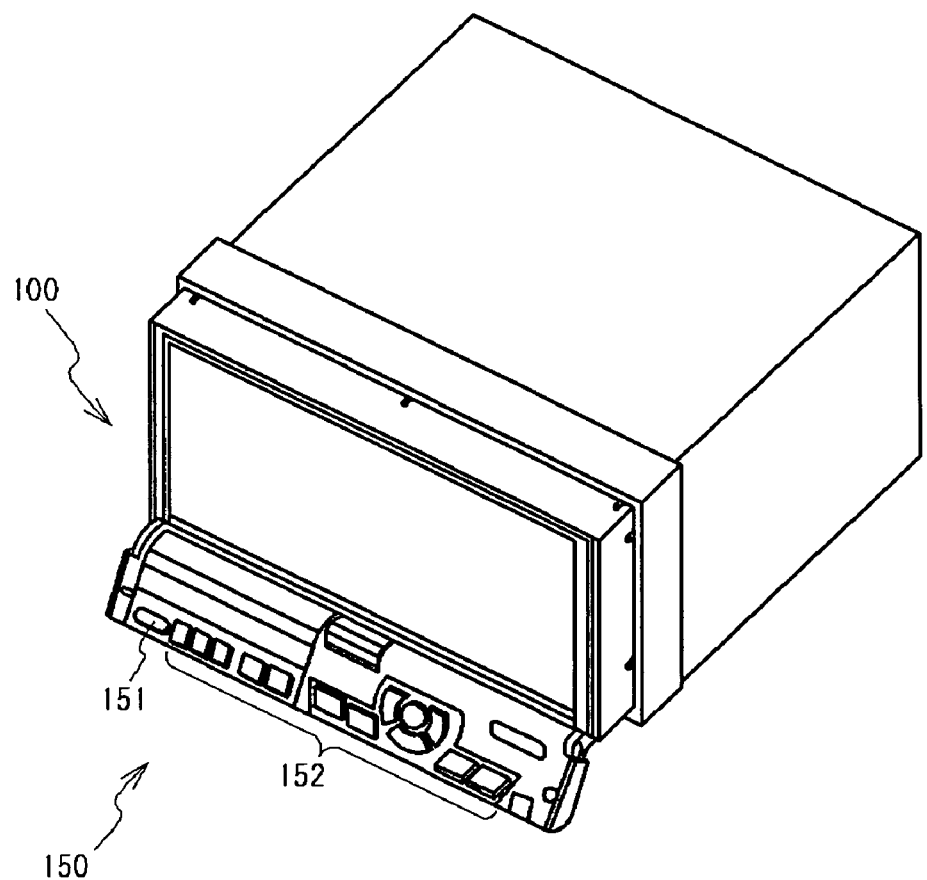
FIG. 10 is an external view of the display apparatus in accordance with the first embodiment of the present invention.

FIG. 10 is an external view of the display apparatus in accordance with the first embodiment. The display unit 100 has the operation portion 150, and an operation mode switching button 151 is provided on the operation portion 150. The switching button 151 is pressed to switch the operation mode between a first operation mode in which an operation on the first image displayed on a D-seat screen (a first screen) that is the screen on the side of the driver's seat is allowed, and a second operation mode in which an operation on the second image displayed on a P-seat screen (a second screen) that is the screen on the side of the passenger's seat is allowed. In the first operation mode, the operator can perform an operation on the D-seat image by pressing the operation buttons 152 or the touch panel 130 of the display unit 100. Likewise, in the second operation mode, the operator can perform an operation on the P-seat image by pressing the operation buttons 152 or the touch panel 130 of the display unit 100. With this structure, it is possible to perform an operation only on the D-seat image or the P-seat image, even if the same means is used to issue an instruction with respect to an operation to be performed on the D-seat image, and to issue an instruction with respect to an operation to be performed on the P-seat image. Accordingly, the operator can perform an operation only on a desired image.

Figure 12:
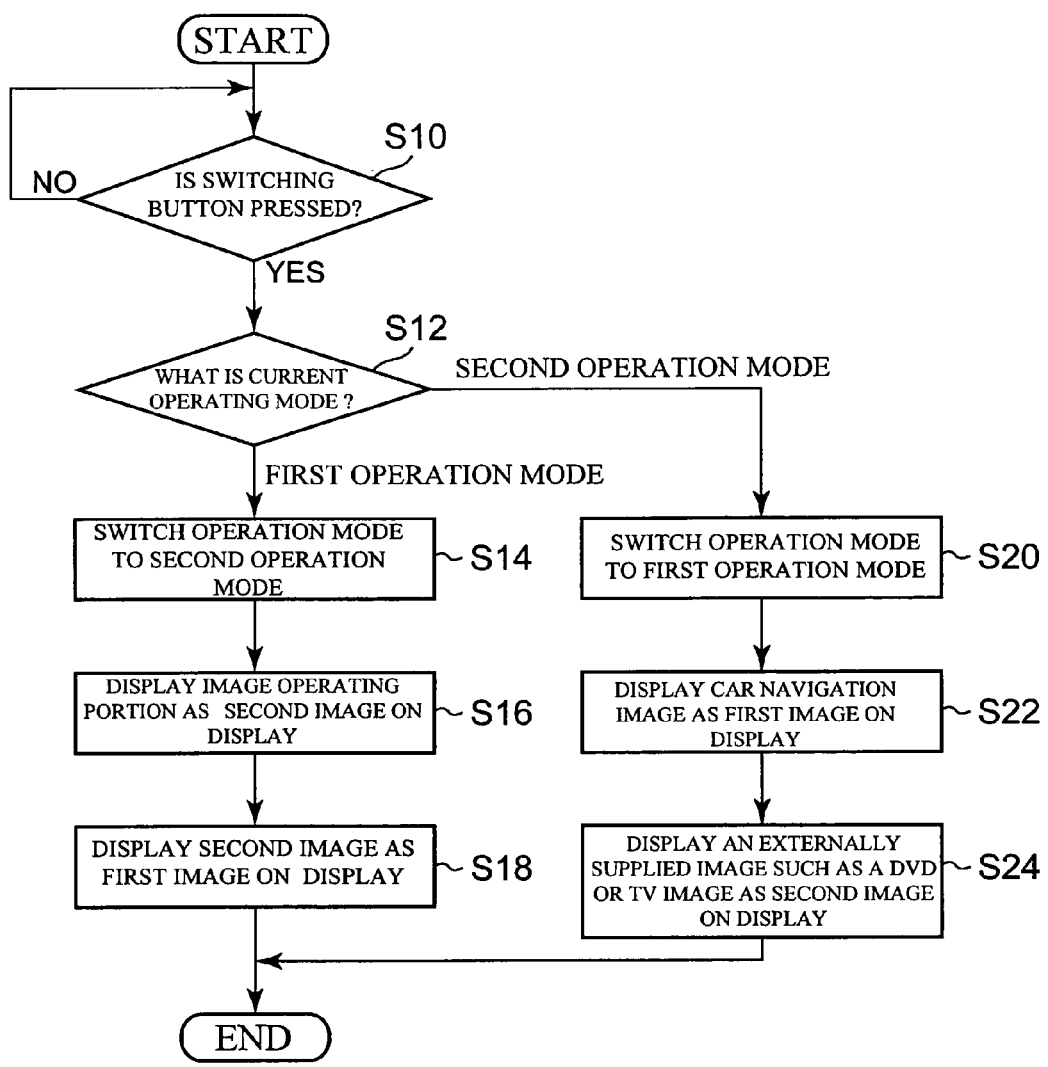
FIG. 12 is a flowchart of an image control operation to be performed by the controller.

Referring now to FIGS. 11A through 11D and FIG. 12, a method for controlling the screens of the display apparatus in accordance with the first embodiment is described. FIGS. 11A through 11D show the P-seat screen (the second screen) and the D-seat screen (the first screen). FIG. 12 is a flowchart of an image control operation to be performed by the controller 20 (the image control unit) of the display apparatus. This control operation is started when a multi-view display is displayed, and is continued until the multi-view display is ended (turned off). As shown in FIG. 11A, an image of a DVD or the like is displayed in both the P seat and the D seat in a stopped state, and the operating right is held by the D-seat. In other words, the operation mode is the first operation mode. For example, the switching button 151 for switching the operating right provided on the operation portion 150 is pressed. As shown in FIG. 12, the controller 20 then determines whether the switching button 151 for switching the operating right is pressed in step S10. Since the switching button 151 is pressed, the controller 20 moves on to step S12. The controller 20 then determines whether the current operation mode is the first operation mode or the second operation mode (step S12). Since the current operation mode is the first operation mode, the controller 20 moves on to step S14. The controller 20 switches the operation mode to the second operation mode (step S14).

As shown in FIGS. 11B and 12, the controller 20 displays a touch panel switch as an image display unit for a predetermined period of time, as well as the image already displayed on the P-seat screen. After the predetermined period of time has passed, the controller 20 causes the touch panel switch to disappear (step S16). The controller 20 then displays the same image on the D-seat screen as the image (the second image IM2) displayed on the P-seat screen (step S18). Since the touch panel switch is displayed on the P-seat screen, the passenger in the P seat can handle the touch panel switch to perform an operation on the second image IM2 on the P-seat screen. For example, a destination is set in the car navigation in FIG. 11C.

As shown in FIGS. 12 and 11D, the switching button 151 is pressed to return the operating right from the P seat to the D seat. The controller 20 determines whether the switching button 151 is pressed in step S10. Since the switching button 151 is pressed, the controller 20 moves on to step S12. The controller 20 then determines whether the current operation mode is the first operation mode or the second operation mode (step S12). Since the current operation mode at this point is the second operation mode, the controller 20 moves on to step S20. The controller 20 then switches the operation mode to the first operation mode (step S20). The controller 20 causes the D-seat screen to display a map of the area surrounding the present location as a car navigation image (step S22). The controller 20 also causes the P-seat screen to display an externally supplied image such as a DVD image or a TV image (step S24).

When the operating right is switched as shown in FIGS. 11C and 11D, the P-seat screen is switched from the destination setting image to the image such as a DVD image that is displayed before the P-seat screen is switched to the destination setting image as shown in FIG. 11A. The passenger in the P seat is more likely to enjoy a DVD or TV image rather than an image related to the driving such as a car navigation image. A car navigation image or the like tends to be temporarily operated or displayed. Therefore, after the operation mode is switched from the second operation mode to the first operation mode during the display of a car navigation image on the P-seat screen, an externally supplied image such as a DVD or TV image is displayed on the P-seat screen. Accordingly, the number of operations to be performed in the passenger's seat can be reduced. Thus, the passenger in the passenger's seat can enjoy an image such as a DVD or TV image without bothering himself/herself with troublesome operations. If an externally supplied image such as a DVD or TV image is already displayed on the P-seat screen immediately before the operation mode is switched from the second operation mode to the first operation mode, the image such as a DVD or TV image already displayed immediately before the operation mode is switched from the second operation mode to the first operation mode is again displayed.

The operator in the driver's seat (the observer OBR in FIG. 1, or the driver) is likely to use a car navigation image as an image related to the driving. Therefore, as shown in FIG. 11D and step S22 of FIG. 12, when the operation mode is switched from the second operation mode to the first operation mode, the controller 20 causes the D-seat screen (or the screen on the driver's seat side) to display a navigation image. In this manner, the number of operations to be performed by the driver can be reduced. Thus, the driver can concentrate on driving as hard as one should.

Among navigation images, the driver is likely to use a car navigation image showing a map of the area surrounding the present location that is often referred to and required to check the running condition. Therefore, when the operation mode is switched from the second operation mode to the first operation mode, it is preferable that the controller 20 causes the D-seat screen to display a map of the area surrounding the present location as a car navigation image, as shown in FIG. 11D. In this manner, the number of operations to be performed by the driver can be further reduced.

Second Embodiment

Figure 13A:
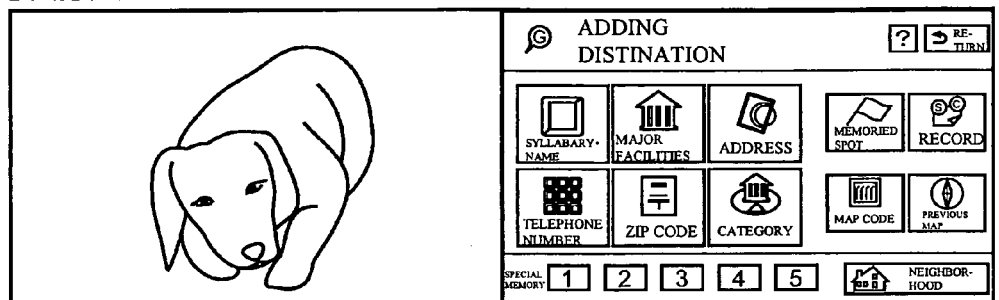
Figure 13A:
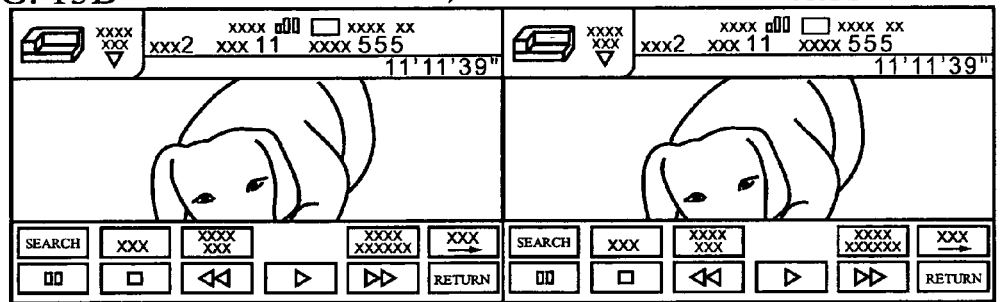
Figure 13A:
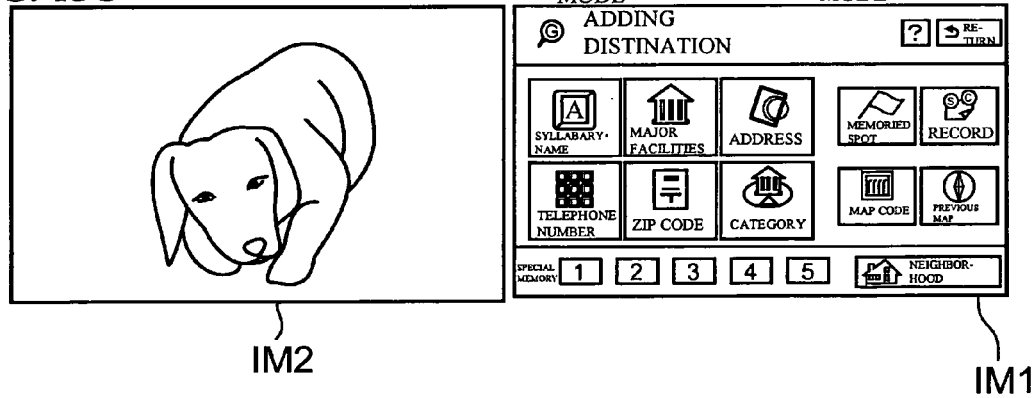

In the second embodiment, in the first operation mode, a DVD image is displayed on the P-seat screen, and a destination adding image of the car navigation is displayed on the D-seat screen, as shown in FIG. 13A. The operation mode is then switched to the second operation mode, as shown in FIG. 13B. The touch panel switch is superimposed on the image displayed on the P-seat screen shown in FIG. 13A. The same image as the image displayed on the P-seat screen is displayed on the D-seat screen. The operation mode is then switched back to the first operation mode, as shown in FIG. 13C. The touch panel switch disappears from the P-seat screen. The D-seat screen then displays the first image IM1 that was on the D-seat screen immediately before the operation mode was switched from the first operation mode to the second operation mode. Accordingly, the D-seat screen displays the destination adding image of the car navigation.

As described above, when the operation mode is switched from the second operation mode to the first operation mode, the controller 20 causes the D-seat screen to display the image that was displayed as the first image IM1 immediately before the previous switching of the operation mode from the first operation mode to the second operation mode. In this manner, when the operating right is moved to the D-seat side, the image having its operating right held by the D-seat side immediately before the switching is displayed. It is highly likely that the driver who has regained handles the image he/she was using immediately before the switching. Accordingly, the driver can handle the image which he/she held the right to handle immediately before the switching, without an operation to retrieve the image. Thus, the number of operations to be performed by the driver can be reduced.

In the first and second embodiments, in a case where the vehicle is running when the operation mode is switched from the second operation mode to the first operation mode, outputs of TV images or DVD images to the D-seat screen might be prohibited under certain restrictions (when video viewing while driving is restricted), even if a TV image or a DVD image is already displayed on the D-seat screen. Also, car navigation images might be prohibited from handling under certain restrictions. In such cases, the driver might feel discomfort. When an image that cannot be handled is displayed while driving, it is highly likely that the driver switches to an image that can be handled. Therefore, in a case where the vehicle is running when the operation mode is switched to the first operation mode, the controller 20 causes the D-seat screen to display a map of the area surrounding the present location as a navigation image, as in the case shown in FIG. 11D. While the vehicle is running, there is a high possibility that the driver handles a map of the area surrounding the present location. Accordingly, the number of operations to be performed by the driver can be further reduced.

In the first and second embodiments, the switching button 151 is used to switch the operation mode between the first operation mode and the second operation mode. However, the technique for switching the operation mode between the first operation mode and the second operation mode is not limited to that. For example, a switching button may be added to the first image IM1 and the second image IM2, and the operation mode may be switched by touching the switching button.

Although the embodiments of the present invention have been described so far, the present invention is not limited to those specific examples, and various changes and modifications may be made to them within the scope of the claimed invention.

The invention claimed is:

1. An in-vehicle display apparatus comprising:
a display unit that displays different images to be seen from a driver's seat side and a passenger's seat side; and
an image control unit that causes the driver's seat side to display a navigation image and causes the passenger's seat side to display a first image not including the navigation image, when operation mode is switched from a second operation mode in which a second image displayed on the driver's seat side is the same as a third image displayed on the passenger's seat side, to a first operation mode in which the second image displayed on the driver's seat side is different from the third image displayed on the passenger's seat side,
wherein neither the second image nor the third image of the second operation mode includes the navigation image immediately before the operation mode is switched from the second operation mode to the first operation mode.

2. The in-vehicle display apparatus as claimed in claim 1, wherein the navigation image is a map of an area surrounding a present location.

3. The in-vehicle display apparatus as claimed in claim 1, wherein, when the vehicle is running at the time of switching to the first operation mode, the image control unit causes the driver's seat side to display a map of an area surrounding a present location as the navigation image.

4. An in-vehicle display apparatus comprising:
a display unit that displays different images to be seen from a driver's seat side and a passenger's seat side; and
an image control unit that causes the driver's seat side to display a first image, when operation mode is switched from a second operation mode in which a second image displayed on the driver's seat side is the same as a third image displayed on the passenger's seat side, to a first operation mode in which the second image displayed on the driver's seat side is different from the third image displayed on the passenger's seat side,
the first image being displayed as the second image on the driver's seat side immediately before previous switching from the first operation mode to the second operation mode and not including a navigation image.

5. The in-vehicle display apparatus as claimed in claim 4, wherein, when the vehicle is running at the time of switching to the first operation mode, the image control unit causes the driver's seat side to display a map of an area surrounding a present location as a navigation image.

* * * * *

UNITED STATES PATENT AND TRADEMARK OFFICE
CERTIFICATE OF CORRECTION

| | | |
|---|---|---|
| PATENT NO. | : 8,373,620 B2 | Page 1 of 1 |
| APPLICATION NO. | : 12/225997 | |
| DATED | : February 12, 2013 | |
| INVENTOR(S) | : Nakano et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 767 days.

Signed and Sealed this
Eleventh Day of November, 2014

Michelle K. Lee
*Deputy Director of the United States Patent and Trademark Office*